United States Patent [19]

Park et al.

[11] Patent Number: 5,202,220
[45] Date of Patent: Apr. 13, 1993

[54] METHOD OF PRODUCING AN OPTICAL RECORDING MEDIUM WITH A TRANSPARENT CONDUCTIVE LAYER

[75] Inventors: Gyou-Tae Park, Choongchungnam-Do; Dong-Soo Lee, Seoul, both of Rep. of Korea

[73] Assignee: SKC Limited, Kyongi-Do, Rep. of Korea

[21] Appl. No.: 818,292

[22] Filed: Jan. 9, 1992

[30] Foreign Application Priority Data

Mar. 18, 1991 [KR] Rep. of Korea ............... 91-4273
May 20, 1991 [KR] Rep. of Korea ............... 91-8155

[51] Int. Cl.$^5$ ............................................. G11B 7/26
[52] U.S. Cl. ................................. 430/276; 430/271; 430/275; 430/495; 430/945; 369/283
[58] Field of Search ............ 430/270, 945, 275, 495, 430/276, 321, 271; 369/275.5, 283; 346/135.1

[56] References Cited

U.S. PATENT DOCUMENTS

| | | | |
|---|---|---|---|
| 3,965,461 | 6/1976 | Wreede et al. | 369/103 |
| 4,449,138 | 5/1984 | Ando | 346/135.1 |
| 4,625,215 | 11/1986 | Muchnik et al. | 346/25 |
| 4,754,544 | 7/1988 | Hanak | 437/2 |
| 5,094,978 | 3/1992 | Miyagaki et al. | 437/181 |

FOREIGN PATENT DOCUMENTS

| | | | |
|---|---|---|---|
| 63-209040 | 8/1988 | Japan | 369/275.5 |
| 3-049053 | 3/1991 | Japan | 369/275.5 |
| 3-132935 | 6/1991 | Japan | 369/275.5 |

*Primary Examiner*—Charles L. Bowers, Jr.
*Assistant Examiner*—John A. McPherson
*Attorney, Agent, or Firm*—James D. Hall

[57] ABSTRACT

An optical recording medium is disclosed herein which comprises an antistatic and scratch-resistant metal oxide layer on the light incident side of a transparent substrate. The metal oxide layer has a light transmittance high enough to transmit at least a portion of the light beam therethrough and a sheet resistivity low enough to suppress the substrate from getting electrostatic. Such a metal oxide layer can be deposited either directly, or through an interfence layer, on the substrate with a thickness of 100 to 1,000 Angstrom.

5 Claims, 2 Drawing Sheets

METHOD OF PRODUCING AN OPTICAL RECORDING MEDIUM WITH A TRANSPARENT CONDUCTIVE LAYER

FIELD OF THE INVENTION

The present invention relates to an optical recording medium; and, more particularly, to a magneto-optical disk having a conductive metal oxide layer deposited on the light beam incident side of a transparent substrate. The present invention is also directed to a method of producing such a magneto-optical disk.

DESCRIPTION OF THE PRIOR ART

In general, optical recording media offer a number of benefits over conventional magnetic tapes or disks in that they have the ability to store binary data at a high recording density and further in that they can enjoy good reliability for an extended period of service time. Examples of such optical recording media include a magneto-optical disk(MOD), a write once read many memory (WORM), a read only memory(ROM) and a compact disk(CD), all being designed to store data/information in an optically readable condition. Of these, the magneto-optical disk is characterized by data erasability and rewritability, which render itself distinguishable over the remaining types of optical recording media.

As is well-known in the art, the magneto-optical disk is manufactured through a number of successive processes, e.g., a mastering process, a stamping process, a subsrate preparation process, a film formation process, and a post-treatment process. In the course of said substrate preparation process, a so-called stamper is employed to shape a disk-like grooved substrate that has a first surface and a second surface opposite to one another. As used herein, the term "first surface" refers to a grooved surface of the substrate on which a recording layer may be deposited in a later process, whereas the term "second surface" is intended to mean a flat surface positioned nearer to the light source than the first surface when the magneto-optical disk comprising said substrate is loaded into its player.

The substrate of such configuration is intrinsically non-conductive and apt to get electrostatic as it is prepared, handled or otherwise used. The static electricity tends to attract such foreign materials as dirt or the like present in the atmosphere, thereby degrading the optical quality of the finished disk or even causing signal transmission errors.

With a view to removing the deficiencies noted above, Japanese Patent Laid-open Publication No. Hei 2-29948 teaches a magneto-optical disk which comprises, as shown in FIG. 1, a transparent substrate 10 having opposite first and second surfaces. Sequentially deposited on the first surface are a conductive layer 12, a recording layer 14, a protective layer 16 and a reflection layer 18. Further, a photocurable resin layer 19 is coated on the second surface. The optical disk disclosed in the publication, supra, appears to be somewhat effective in imparting antistatic property to the first surface. This type of optical disk, however, fails to make the second surface antistatic, nor does it suppress alien materials from sticking to the second surface under the action of static electricity. In addition, when the substrate is being coated with a photocurable resin, a phenomenon called "bubbling" may take place due to the presence of contaminant, i.e., dirt, thereby deteriorating the optical quality of the finished optical disk. Furthermore, "scratching" may occur on the second surface when the contaminated substrate is subjected to a cleaning operation for removal of the contaminant. The finished optical disk itself may also get electrostatic and/or scratched during its actual use.

SUMMARY OF THE INVENTION

Accordingly, it is an object of the present invention to provide an optical recording medium comprising an antistatic and scratch-resistant layer deposited on the light incident side of a transparent substrate.

Another object of the present invention is to provide a method of producing an optical recording medium excellent in antistatic property and scratch-resistance.

In accordance with one aspect of the present invention, there is provided an optical recording medium comprising: a transparent substrate having a first and a second surfaces opposite to one another, said substrate allowing a light beam incident upon the second surface to path therethrough; a recording layer deposited on the first surface of said substrate for storing data/information in an optically readable condition; and a conductive layer provided on the second surface of said substrate, said conductive layer having a light transmittance high enough to transmit at least a portion of the light beam therethrough and a sheet resistivity low enough to suppress the substrate from getting electrostatic.

In accordance with another aspect of the present invention, there is provided a method of producing an optical recording medium, comprising the steps of: providing a transparent substrate having a first and a second surfaces opposite to one another, said substrate allowing a light beam incident upon the second surface to path therethrough; sputtering a metal oxide to form a conductive layer on the second surface of said substrate, said conductive layer having a light transmittance high enough to transmit at least a portion of the light beam therethrough and a sheet resistivity low enough to suppress the substrate from getting electrostatic; and depositing a recording layer on the first surface of said substrate, said recording layer capable of storing data/information in an optically readable condition.

BRIEF DESCRIPTION OF THE DRAWINGS

The above and other objects and features of the present invention will become apparent from the following descriptions taken in conjunction with the accompanying drawings, in which.

DETAILED DESCRIPTION OF THE PREFERRED EMBODIMENTS

Description will now be given to some preferred embodiments of the invention based on a magneto-optical disk by way of example. It should be understood that the invention is not limited to the magneto-optical disk but may be equally applied to other types of optical recording media.

Figure 1:
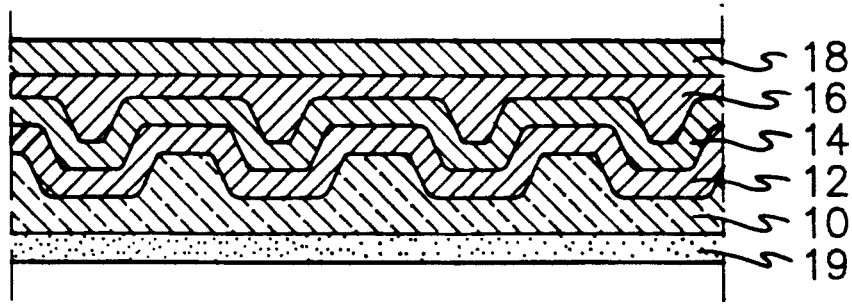
FIG. 1 is a partially enlarged cross-sectional view showing a typical example of the prior art magneto-optical disk.
Figure 2:
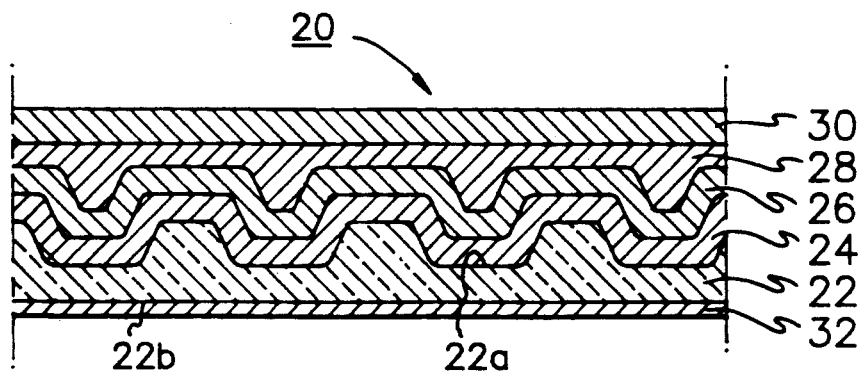
FIG. 2 shows one embodiment of the inventive magneto-optical disk that has a conductive layer deposited directly on the light incident surface of a transparent substrate.

Referring to FIG. 2, there is shown an embodiment of the magneto-optical disk 20 in accordance with the invention. The disk 20 comprises a transparent substrate 22 that has a first, grooved surface 22a and a second, light incident, flat surface 22b opposite to the first surface 22a. It is highly conventional that the substrate 22 can be moulded through the use of a so-called stamper obtained from a known mastering process. The substrate 22 may be made of such transparent resin as polymethyl methacrylate, amorphous olefin, polycarbonate, epoxy and the like. Deposited on the first surface 22a of the substrate 22 are a dielectric layer 24, a recording layer 26, a protective layer 28 and a reflection layer 30, for instance. These layers may be sequentially formed one above another by a known dry process, e.g., sputtering or plasma polymerization. All but the reflection layer 30 are transparent so as to allow a light beam to pass therethrough.

In the embodiment shown in FIG. 2, a transparent conductive layer 32 is deposited directly on the second surface 22b of the substrate 22. Since the substrate 22 is highly susceptible of deformation or shrinkage at a temperature of more than, e.g., 80° C., it is desirable that a low-temperature reactive sputtering process be used to form the conductive layer 32. Preferably, the conductive layer 32 comprises a metal oxide which may exhibit a semiconductive property due to its narrower energy band gap. In other words, the conductive layer should have a high light transmittance, a good electric conductivity and an increased scratch-resistance.

The metal oxide useful for the conductive layer may comprise indium tin oxide, antimony tin oxide, aluminium zinc oxide, cadmium tin oxide, zinc oxide, tin oxide and indium oxide. Of these, it is especially preferable to use indium tin oxide or zinc oxide.

Indium tin oxide may consist of 0.1 to 10, preferably 5 to 10% by weight of $SnO_2$; and 99.9 to 90, preferably 95 to 90% by weight of $In_2O_3$. Using $In_2O_3$ in an amount less than 90% by weight may lead to an unacceptable reduction in electric conductivity of the conductive layer, whereas light transmittance gets poor if the amount of $In_2O_3$ is more than 99.9% by weight.

Antimony tin oxide may contain 0.1 to 10, preferably 0.5 to 3.0% by weight of $Sb_2O_3$; and 99.9 to 90, preferably 99.5 to 97% by weight of $SnO_2$. Using $SnO_2$ in an amount less than 90% by weight may reduce light transmittance to an unacceptable level, whereas electric conductivity becomes poor if the amount of $SnO_2$ is more than 99.9% by weight.

Aluminium zinc oxide may be composed of 0.1 to 10, preferably 1 to 5% by weight of $Al_2O_3$; and 99.9 to 90, preferably, 99 to 95% by weight of ZnO. Using ZnO in an amount less than 90% by weight may result in a reduction in a reduction in light transmittance of the conductive layer, whereas electric conductivity gets lowered if the amount of ZnO is more than 99.9% by weight.

Cadmium tin oxide may be provided in a composition containing 20 to 50, preferably 20 to 30% by weight of $SnO_2$; and 80 to 50, preferably 80 to 70% by weight of CdO. Electric conductivity of the conductive layer becomes poor if the amount of $SnO_2$ is less than 20% by weight, whereas light transmittance may be deteriorated if the amount of $SnO_2$ exceeds the level of 50% by weight.

The following equations can be used to calculate electric conductivity and light trasmittance of the conductive layer 32.

$$R_s = 1/(\delta \cdot t) \qquad [I]$$

$$I = I_o \exp(-\alpha X) \qquad [II]$$

where $R_s$ is the sheet resistivity which is inversely proportional to the electric conductivity of the conductive layer, $\delta$ is the intrinsic electric conductivity of the metal oxide used, t is the thickness of the conductive layer, $I_o$ is the intensity of the incident light beam, I is the intensity of the transmitted light beam, $\alpha$ is the coefficient of lenear obsorption and X is the light transmission distance which is equal to the thickness t of the conductive layer.

As can be seen from the equations represented above, both the sheet resistivity $R_s$ and the light transmittance $I/I_o$ depend largely on the thickness t of the conductive layer 32. It has been found that the sheet resistivity is required to be less than $10^3 \Omega/cm^2$ with the light transmittance of more than 85%. The reason for this is that the antistatic property becomes poor if the sheet resistivity exceeds $10^3 \Omega/cm^2$ and that the laser output has to be increased if the light transmittance falls short of 85%. In order to meet the requirements, the conductive layer should range from 100 to 1,000 Angstrom, preferably from 300 to 600 Angstrom in thickness. Although the actual thickness of the conductive layer 32 is extremely thin as compared with that of the transparent substrate 22, the drawings attached hereto show the conductive layer on an exaggerated scale for the purpose of illustration.

Figure 3:
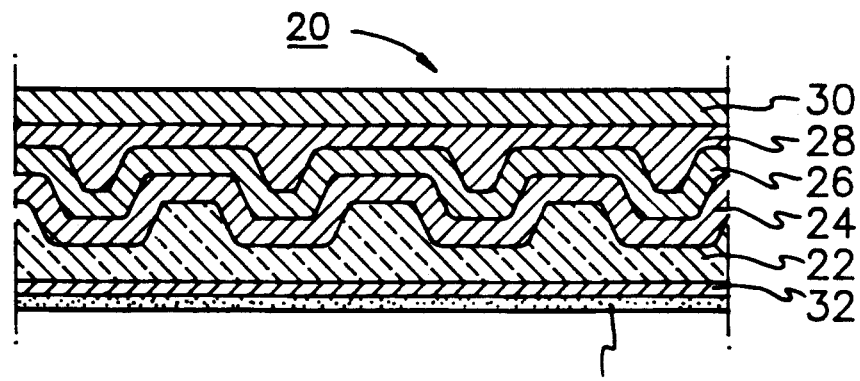
FIG. 3 is a view similar to FIG. 1 but showing a modified embodiment of the inventive magneto-optical disk having a conductive layer and a curable resin layer, each layer being sequentially deposited on the light incident surface one above the other.

FIG. 3 illustrates a modified embodiment of the magneto-optical disk in accordance with the present invention. This modification differs from the disk shown in FIG. 2 in that a curable resin layer 34 is additionally deposited on the outer surface of the conductive layer 32. It is known that the curable resin layer 34 may be made of photocurable prepolymer, e.g., polyurethane acrylic resin. Such a resin layer 34 would help enhance the peel-off resistance of the conductive layer 32.

Figure 4:
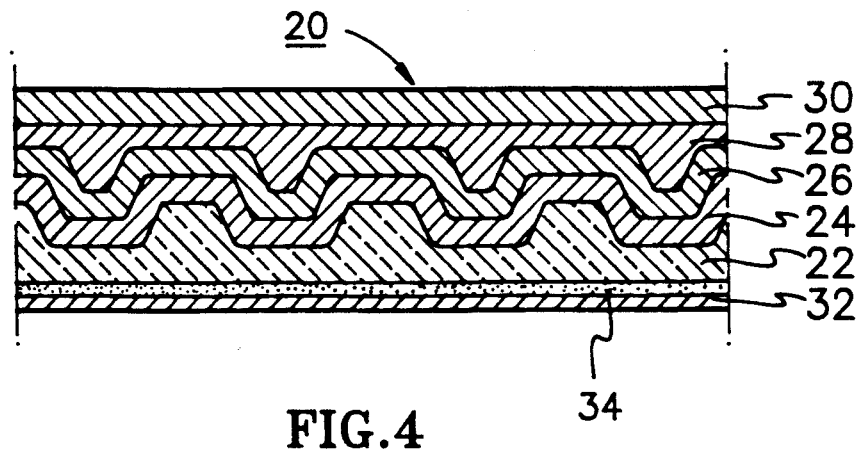
FIG. 4 is a view illustrating another modified embodiment of the inventive magneto-optical disk wherein a conductive layer lies on a curable resin layer which, in turn, is deposited directly on the light incident surface of a transparent substrate.

In FIG. 4, there is shown another modified embodiment of the inventive magneto-optical disk. This modification is structurally similar to the disks depicted in FIGS. 2 and 3, but differs from them in that a curable resin layer 34 is interposed between the substrate 22 and the conductive layer 32.

Figure 5:
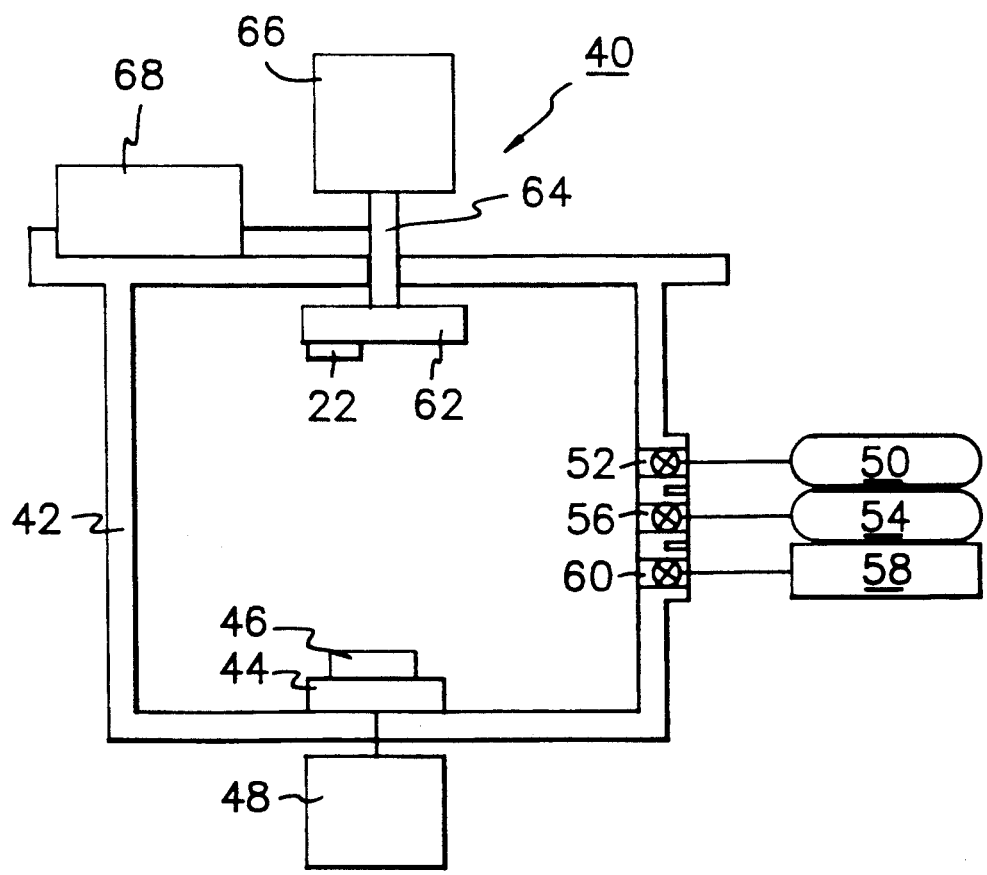
FIG. 5 is a schematic view showing a typical sputtering apparatus for use in applying various substance layers on the opposite sides of a transparent substrate.

In depositing the various layers on the opposite surfaces of the substrate, a conventional sputtering apparatus 40 may be utilized which is schematically shown in FIG. 5. The sputtering apparatus 40 is provided with a hermetically sealable sputter chamber 42 that can house therein one or more magnetron sputter sources. FIG. 5 illustrates only one sputter source 44 for the sake of simplicity. Such a sputter source 44 is typically located on the floor of the sputter chamber 42 so as to hold a target material, e.g., a metal oxide target 46 in place. A radio frequency(RF) power supply 48 is electrically connected to the sputter source 44 in a known manner. Provided on the side wall of the sputter chamber 42 are an oxygen inlet port 52 through which oxygen gas is fed from an oxygen supply unit 50, an argon inlet port 56 through which argon gas is supplied from an agron supply unit 54, and an exhaust port 60 which is coupled to an exhaust unit 58. The sputter chamber 42 will be evacuated to a given pressure by the exhaust unit 58 before the oxygen and argon gases are fed into the sputter chamber 42, as described below in more detail. The sputtering apparatus 40 is additionally provided with, at its top, a substrate holder 62 that serves to hold the substrate 22 in position. The holder 62 is operatively coupled to a drive unit 66 through a rotary shaft 64 which, in turn, is electrically connected to a power supply 68.

The magneto-optical disk shown in FIG. 2 can be prepared through a sputtering process as set forth below. The substrate 22 is first attached to the holder 62 of the sputtering apparatus 40 so that the second, light incident surface thereof can face downward. A suitable oxide target 46 is then placed on the sputter source 44 in a confronting relationship with the substrate 22. Subsequently, the exhaust unit 58 is driven to evacuate the sputter chamber 42 to a predetermined pressure, while introducing reaction gases, i.e., gaseous oxygen and argon, into the sputter chamber 42 at different flow rates. As the holder 62 begins to rotate by the drive unit 66, RF power is applied to the sputter source 44 so that the metal oxide target 46 can be subjected to sputtering. Such a sputtering process will continue until the transparent conductive layer of a desired thickness is deposited on the second surface of the substrate 22. Once the formation of the conductive layer comes to an end, the substrate 22 is turned over so as to have the first surface thereof faced toward the sputter source 44. Finally, a succession of layers, e.g., a dielectric layer, a recording layer, a protective layer, a reflection layer and other optional layers is sequentially formed on the first surface in a known manner.

In preparing the disk shown in FIG. 3, a coating of a photocurable resin is additionally provided on the conductive layer by a spin-coat technique, for example. The resin layer preferably ranges from 5 to 10 $\mu$m in thickness. When the magneto-optical disk of FIG. 4 is to be prepared, it is necessary to first deposit the resin layer directly on the second surface of the substrate and then overlay the conductive layer on the resin layer. Seven examples for depositing a number of different conductive layers on the second surface of the substrate and two comparative example will be described in the following.

EXAMPLE 1

A naked polycarbonate substrate was attached to the substrate holder 62 of the sputtering apparatus 40 so that the second, light incident surface can face toward the magnetron sputter source 44. A target of indium tin oxide comprising 5% by weight of $SnO_2$ and 95% by weight of $In_2O_3$ was placed on the sputter source 44. The exhaust unit 58 was driven to evacuate the sputter chamber 42 to a pressure of $5\times10^{-3}$ Torr. While introducing argon gas through the inlet port 56 at a flow rate of 30 SCCM, oxygen gas was concurrently fed into the sputter chamber 42 at a flow rate of 2 SCCM through the inlet port 52. The exhaust unit 58 was reactivated to keep the gas pressure in the sputter chamber 42 at $5\times10^{-3}$ Torr. Thereafter, the substrate holder 62 was rotated at a speed of 60 rpm; and RF power of 150 W was supplied to the sputter source 44 to perform sputtering for about 25 minutes. As a result, a conductive layer of 600 Angstrom in thickness was deposited on the second surface of the substrate.

The sheet resistivity of the resulting conductive layer was as low as $200\Omega/cm^2$. Rockwell hardness measured by ASTM D 785 was equal to M 105. The antistatic property thereof was so excellent that no static electricity was detected after the conductive layer had been vigorously rubbed with a patch of cloth for 10 seconds.

EXAMPLE 2

Except that zinc oxide was used in place of indium tin oxide, the same procedure as in Example 1 was repeated to obtain a conductive layer of 600 Angstrom in thickness. The sheet resistivity of the resulting conductive layer was as low as $200\Omega/cm^2$. Rockwell hardness was equal to M 105. No static electricity was detected after a rubbing test for 10 seconds.

EXAMPLE 3

Except that antimony tin oxide comprising 3% by weight of $Sb_2O_3$ and 97% by weight of $SnO_2$ was used as the target material, the same procedure as in Example 1 was carried out to obtain a conductive layer of 600 Angstrom in thickness. The sheet resitivity of the resulting conductive layer was equal to $200\Omega/cm^2$. Rockwell hardness was no less than M 105. No static electricity was detected after a rubbing test for 10 seconds.

EXAMPLE 4

Except that tin oxide($SnO_2$) was used as the target material, the same procedure as in Example 1 was carried out to obtain a conductive layer of 600 Angstrom in thickness. The sheet resistivity of the resulting conductive layer was equal to $250\Omega/cm^2$. Rockwell hardness was no less than M 105. No static electricity was detected after a rubbing test for 10 seconds.

EXAMPLE 5

Except that indium oxide($In_2O_3$) was used as the target material, the same procedure as in Example 1 was carried out to obtain a conductive layer of 600 Angstrom in thickness. The sheet resistivity of the resulting conductive layer was equal to $250\Omega/cm^2$. Rockwell hardness was no less than M 103. No static electricity was detected after a rubbing test for 10 seconds.

EXAMPLE 6

Except that aluminium zinc oxide comprising 5% by weight of $Al_2O_3$ and 95% by weight of $ZnO$ was used as the target material, the same procedure as in Example 1 was carried out to obtain a conductive layer of 600 Angstrom in thickness. The sheet resistivity of the resulting conductive layer was as high as $500\Omega/cm^2$. Rockwell hardness was no less than M 103. No static electricity was detected after a rubbing test for 10 seconds.

EXAMPLE 7

Except that cadmium tin oxide comprising 25% by weight of $SnO_2$ and 75% by weight of $CdO$ was used as the target material and that RF power of 0.25 Kw was applied to the magnetron sputter source, the same procedure as in Example 1 was carried out to obtain a conductive layer of 600 Angstrom in thickness. The sheet resistivity of the resulting conductive layer was as low as 200$\Omega$/cm$^2$. Rockwell hardness was equal to M 105. No static electricity was detected after a rubbing test for 10 seconds.

COMPARATIVE EXAMPLE 1

A polycarbonate substrate of 120 mm in diameter and 1.2 mm in thickness was molded through the use of a stamper. The substrate had a first, grooved surface and a second, flat surface opposite to the first surface. Neither the first surface nor the second surface was subjected to any film formation process. The sheet resistivity of the second surface was found to be infinite. Rockwell hardness was as low as M 95. The static electricity thereof after a rubbing test for 10 seconds was equal to 50 KV.

COMPARATIVE EXAMPLE 2

A layer of polyurethane acrylic resin was coated by using the spin-coat technique on the second surface of the polycarbonate substrate as used in Comparative Example 1, thereby forming a resin layer of 7 μm in thickness. The sheet resistivity of the resin layer was found to be infinite. Rockwell hardness was not more than M 98. The static electricity thereof after a rubbing test for 10 seconds was equal to 10 KV.

As is apparent from the foregoing Examples, the conductive metal oxide layer provided on the second surface of the substrate makes it possible to prepare a magneto-optical disk that is excellent in its antistatic property, hardness and scratch-resistance.

What is claimed is:

1. In a method of producing an optical recording medium by way of: providing a transparent substrate having first and second opposite surfaces, forming a resin layer and a conductive oxide layer one above the other on the second surface of said substrate, and depositing a recording layer on the first surface of said substrate, the improvement which comprises:

depositing said resin layer on the second surface of said substrate prior to forming any other layers of the optical recording medium; and, thereafter, placing said conductive layer over the resin layer, said conductive layer having a light transmittance of no less than 85% and a sheet resistivity of no greater than 10$^3$$\Omega$/cm$^2$.

2. The method as recited in claim 1, wherein said conductive layer comprises 0.1 to 10% by weight of SnO$_2$ and 99.9 to 90% by weight of In$_2$O$_3$.

3. The method as recited in claim 1, wherein said conductive layer comprises 0.1 to 10% by weight of Sb$_2$O$_3$ and 99.9 to 90% by weight of SnO$_2$.

4. The method as recited in claim 1, wherein said conductive layer comprises 0.1 to 10% by weight of Al$_2$O$_3$ and 99.9 to 90% by weight of ZnO.

5. The method as recited in claim 1, wherein said conductive layer comprises 20 to 50% by weight of SnO$_2$ and 80 to 50% by weight of CdO.

* * * * *